United States Patent
Fraley et al.

(10) Patent No.: US 6,786,508 B2
(45) Date of Patent: Sep. 7, 2004

(54) OCCUPANT PROTECTION APPARATUS FOR A VEHICLE

(75) Inventors: Gregory S. Fraley, Farmington Hills, MI (US); Thomas J. Fowler, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/262,647

(22) Filed: Sep. 30, 2002

(65) Prior Publication Data

US 2004/0061321 A1 Apr. 1, 2004

(51) Int. Cl.$^7$ ............................................. B60R 21/04
(52) U.S. Cl. ........................................................ 280/751
(58) Field of Search ........................ 280/748, 751–753, 280/770; 188/267.1, 267.2, 275–277; 267/116

(56) References Cited

U.S. PATENT DOCUMENTS

| | | | |
|---|---|---|---|
| 3,672,657 A | | 6/1972 | Young et al. |
| 4,349,214 A | | 9/1982 | Inasawa et al. |
| 4,757,981 A | | 7/1988 | Härtel |
| 4,853,270 A | | 8/1989 | Wycech |
| 5,098,124 A | * | 3/1992 | Breed et al. ............... 280/751 |
| 5,141,279 A | * | 8/1992 | Weller ..................... 296/146.7 |
| 5,353,839 A | * | 10/1994 | Kordonsky et al. ......... 137/806 |
| 5,497,861 A | * | 3/1996 | Brotz ....................... 188/267.1 |
| 5,545,128 A | | 8/1996 | Hayes et al. |
| 5,547,049 A | * | 8/1996 | Weiss et al. ............. 188/267.2 |
| 5,564,535 A | | 10/1996 | Kanianthra |
| 5,857,698 A | | 1/1999 | Fuerst et al. |
| 5,915,819 A | | 6/1999 | Gooding et al. |
| 5,927,753 A | | 7/1999 | Faigle et al. |
| 5,985,168 A | | 11/1999 | Phule |
| 6,019,392 A | | 2/2000 | Karlow |
| 6,036,226 A | | 3/2000 | Brown et al. |
| 6,039,347 A | | 3/2000 | Maynard |
| 6,145,880 A | | 11/2000 | White et al. |
| 6,152,488 A | | 11/2000 | Hedderly et al. |
| 6,202,806 B1 | | 3/2001 | Sandrin et al. |
| 6,234,526 B1 | | 5/2001 | Song et al. |

(List continued on next page.)

FOREIGN PATENT DOCUMENTS

| | | |
|---|---|---|
| DE | 199 61 716 | 7/2001 |
| FR | 2 819 766 | 7/2002 |
| WO | 98/33684 | 8/1998 |
| WO | 99/49236 | 9/1999 |

OTHER PUBLICATIONS

Barnes, H. A. (1989). "Shear Thickening (Dilatancy) in Suspensions of nonaggregating Solid Particles Dispersed in Newtonian Liquids" *Journal of Rheology* 33(2): 329–366.

Courtney, W.A. and S. O. Oyadiji (2001). "Preliminary investigations into the mechanical properties of a novel shock absorbing elastomeric composite" *Journal of Materials Processing Technology* 119(1–3): 379–386.

Jakobsson, L., B. Lundell, et al. (2000). "WHIPS—Volvo's Whiplash Protection Study" *Accid. Anal. Prev.* 32(2): 307–19.

Klingenberg, D. J. (2001). "Magnetorheology: Applications and challenges" *A.I.ChE. Journal* 47(2): 246–249.

*Primary Examiner*—Paul N. Dickson
*Assistant Examiner*—Laura B. Rosenberg
(74) *Attorney, Agent, or Firm*—Bill C. Panagos

(57) ABSTRACT

An occupant protection apparatus includes a housing and a bladder mounted relative to the housing. The bladder has at least one flexible wall and defines a chamber having an electrorheological or magnetorheological fluid disposed therein. The apparatus further includes a device for creating an electrical or magnetic field about a volume of the fluid to alter the effective viscosity of the fluid when the flexible wall is moved relative to the housing, thereby altering the acceleration rate of the flexible wall relative to the housing.

20 Claims, 3 Drawing Sheets

U.S. PATENT DOCUMENTS

| | | |
|---|---|---|
| 6,244,625 B1 * | 6/2001 | Bayer et al. ................ 280/751 |
| 6,279,952 B1 | 8/2001 | Van Wynsberghe et al. |
| 6,340,175 B1 | 1/2002 | Hughes et al. |
| 6,354,626 B1 | 3/2002 | Cartwright |
| 6,394,239 B1 | 5/2002 | Carlson |
| 6,475,937 B1 * | 11/2002 | Preisler et al. ............... 442/370 |
| 6,637,557 B2 * | 10/2003 | Oliver et al. ............ 188/267.2 |
| 2001/0037169 A1 | 11/2001 | Clair |
| 2002/0125084 A1 * | 9/2002 | Kreuzer et al. .......... 188/267.1 |

\* cited by examiner

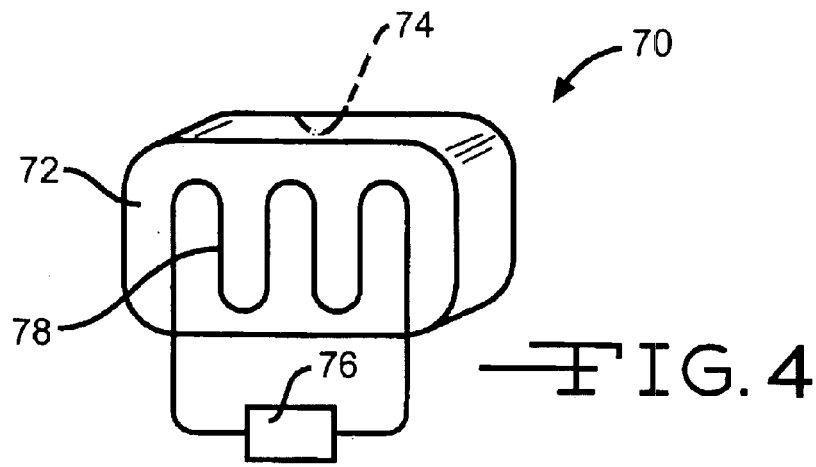
FIG. 4
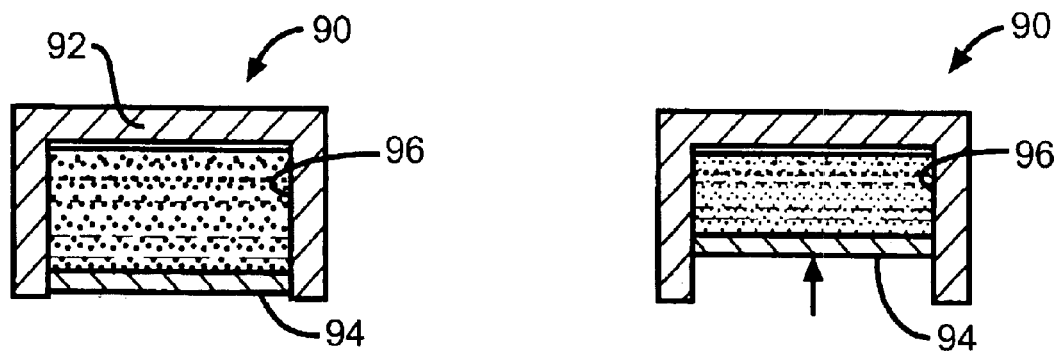
FIG. 5
FIG. 6
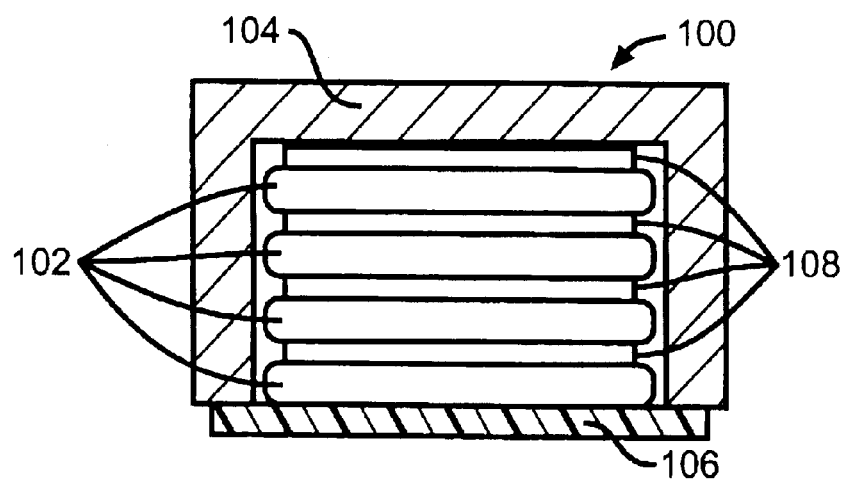
FIG. 7

OCCUPANT PROTECTION APPARATUS FOR A VEHICLE

BACKGROUND OF THE INVENTION

This invention relates in general to safety devices mounted within the interior of the vehicle for assisting in the protection of an occupant, such as during an impact situation.

In a vehicle impact condition, sudden large impact forces may be delivered to the occupant of the vehicle, such as in a rearward, frontal, or side impact. It is also common during large impact conditions for the head and limbs of the occupant to be forced against various panels and structures of the vehicle, thereby causing injury.

Various countermeasures have been taken to help reduce the degree of injury during the impact conditions. For example, passive restraint systems, such as air bags or air curtains have been implemented into vehicles. Generally, air bag systems are stored and packaged in deflated condition in storage areas within the passenger compartment of the motor vehicle. The air bag systems include sensors located at various points in the vehicle. Upon impact, the sensors are triggered thereby sending a signal to a gas generator or igniter. The gas generator operates to inflate the air bag when it receives a signal from the sensors. The air bags are located at various areas within the interior of the vehicle in which contact with the occupant is likely. For example, air bags are positioned in front of the driver and passenger locations, such as in the steering wheel and passenger side of the instrument panel. Air curtains are also positioned along the sides of the occupants, such as mounted at the edges of the headliner and propelled downwardly when inflated. Side air curtains have also been incorporated into the side portions of the seat backs.

It is also known to incorporate energy absorbing structures within the interior of the vehicle. These energy absorbing structures are located at areas of the vehicle which are likely to be contacted by the occupant, such as in knee bolster areas. Typically, the energy absorbing structures are made of materials, such as metal or plastic, which are designed to deform upon impact. The deformation of the material absorbs impact loads, thereby lessening injury to the occupant.

Although the air bags and energy absorbing structures assist in reducing injury to the vehicle occupants, they are not actively controllable depending on the severity of the impact situation.

BRIEF SUMMARY OF THE INVENTION

This invention relates in general to safety devices mounted within the interior of the vehicle for assisting in the protection of an occupant, such as during an impact situation. In particular, a preferred embodiment of the present invention is an occupant protection apparatus including a housing and a bladder mounted relative to the housing. The bladder has at least one flexible wall and defines a chamber having an electrorheological or magnetorheological fluid disposed therein. The apparatus further includes a device for creating an electrical or magnetic field about a volume of the fluid to alter the effective viscosity of the fluid when the flexible wall is moved relative to the housing, thereby altering the acceleration rate of the flexible wall relative to the housing.

In another aspect of the invention, the apparatus may include a bladder defining a chamber having an electrorheological or magnetorheological fluid disposed therein. A wall is movably mounted relative to the housing such that movement of the wall alters the volume of the chamber. An open cell foam is disposed in the chamber such that the open cell foam contains gas within a portion of the cells and contains the fluid within another portion of the cells, such that the gas is generally interspersed within the fluid. The apparatus further includes a device for creating an electrical or magnetic field about a volume of the fluid to alter the effective viscosity of the fluid when the wall is moved to decrease the volume of the chamber by the compression of the gas, thereby altering the acceleration rate of the wall relative to the housing.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a schematic elevational view of an embodiment of an occupant protection apparatus including a flexible bladder having an electrical circuit mounted thereon for controlling the occupant protection apparatus.

FIG. 5 is schematic cross-sectional view of a second embodiment of an occupant protection apparatus in accordance with the present invention.

FIG. 6 is a schematic cross-sectional view of the apparatus of FIG. 5, wherein the apparatus is subjected to an impact load.

FIG. 7 is schematic cross-sectional view of a third embodiment of an occupant protection apparatus in accordance with the present invention.

DETAILED DESCRIPTION OF THE INVENTION

Figure 1:
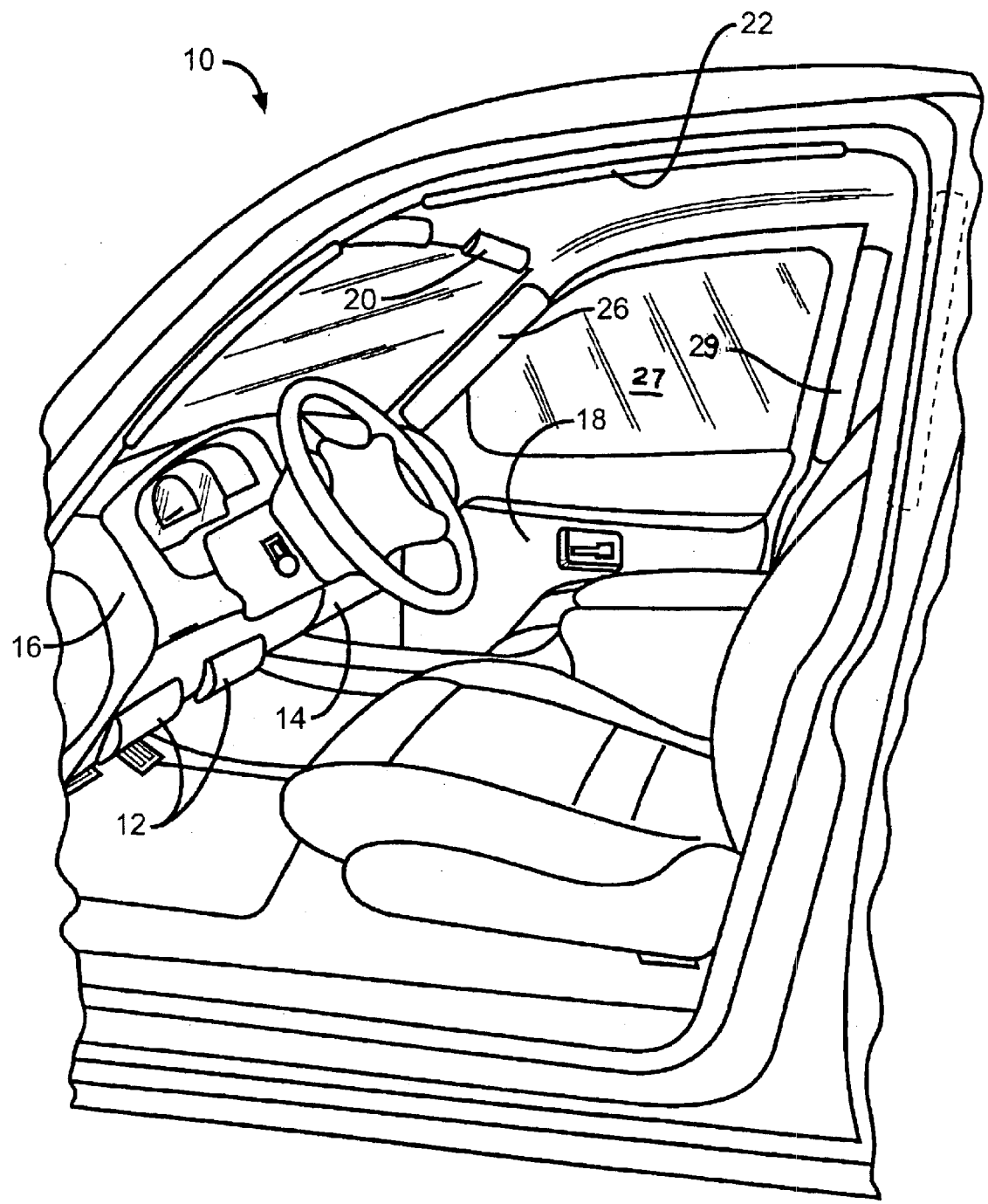
FIG. 1 is a perspective view of an interior of a vehicle in which the occupant protection apparatus of the present invention can be incorporated.

Referring now to the drawings, there is illustrated in FIG. 1, a vehicle interior, indicated generally at 10. In accordance with the present invention, an occupant protection apparatus, as shown in FIGS. 2 through 9, can be incorporated within various regions of the vehicle interior which are likely to in contact with an occupant when the occupant is hurled or moved about the interior, such as during an impact condition. The occupant protection apparatus generally provides energy absorption or energy management of the impact forces acting on the occupant by altering the deflection size of the occupant protection apparatus, as will be explained in detail below. The occupant protection apparatus can be mounted behind a decorative trim component. Suitable locations for locating an occupant protection apparatus include the driver side knee bolster region 12 and the passenger side knee bolster region 14. These knee bolster regions 12 and 14 are generally located in the lower portion of an instrument panel 16. The passenger side knee bolster 14 may be incorporated into the door of a storage compartment, sometimes commonly referred to as the glove box. Of course, other areas of the instrument panel 16, such as upper portions thereof, may include an occupant protection apparatus. Another suitable location is a door panel 18 to provide side protection. Additional, likely head impact regions, such as the lateral edges 20 of a headliner and the longitudinal edges 22 of the headliner may also be suitable locations. Also, the generally vertical side frame members of the vehicle may be suitable locations. In the embodiment of the interior 10 of FIG. 1, these side frame pillars include an "A" pillar 26 located between the edge of a windshield and a door window 27, and a "B" pillar 29 located behind door window. The vehicle seat and headrests may also incorporate an occupant protection apparatus.

Figure 2:
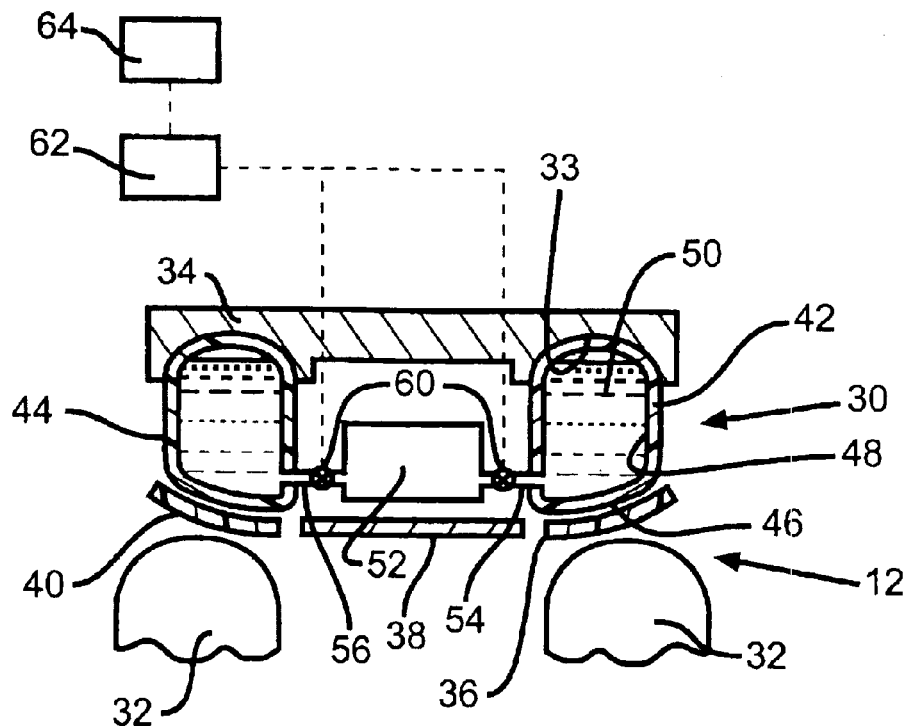
FIG. 2 is a schematic cross-sectional view of a knee bolster region of the vehicle interior incorporating a first embodiment of an occupant protection apparatus of the present invention.

There is illustrated in FIG. 1, a first embodiment of an occupant protection apparatus, indicated generally at 30. The apparatus 30 is shown incorporated into the driver side knee bolster region 12 in front of the driver's knees 32. The apparatus 30 can be mounted on the vehicle by any suitable manner, and is schematically shown in FIG. 2 mounted within a recess 33 formed on a housing 34 which can be any frame member or portion of the instrument panel. The apparatus 30 may be housed behind trim panels 36, 38, and 40.

The apparatus 30 includes at least one bladder 42, and more preferably further includes a second bladder 44. The purpose of the two bladders 42 and 44 is to independently protect the pair of driver's knees 32. The bladders 42 and 44 are similar in structure and function and, therefore, only the bladder 42 will be described in detail. The bladder 42 includes a front wall 46 which is located behind the trim panel 36. The bladder 42 defines an interior chamber 48 having a electrorheological or magnetorheological fluid 50 therein, the purpose of which will be explained below. The bladder 42 can be any suitable structure which can store the fluid 50. The bladder 42 preferably includes at least one wall, such as the front wall 46, which is movable relative to the housing 34, such as during impact from the knees 32 of the driver. As will be described in detail below, the movement of the front wall 46 alters the dimensions of the bladder 42, and therefore the position or flow of fluid 50 within the chamber 48. The flow of the fluid 50 is controlled by altering the effective viscosity of the fluid 50, thereby altering the acceleration of the front wall 46 relative to the housing 34. The term "acceleration" as used and described herein may refer to both acceleration and deceleration, wherein the rate of change of velocity with respect to time can be a positive or negative value, e.g., increasing or decreasing with respect to an external reference frame.

As stated above, the bladder 42 can be any suitable structure which can store the fluid 50. Preferably, the bladder 42 is made at least in part with a generally thin walled plastic container similar to a bag-like structure such that the container can be deformed at any location. The bladder 42 can than be originally shaped to accommodate packaging constraints where it is mounted. Also, during impact loads imparted on the bladder 42, the bladder can bend or distort into whatever shape is permitted due to the packaging constraints. Of course, the bladder 42 could include generally rigid walls preferably having at least one flexible wall portion movable relative to the housing 34.

The fluid 50 is preferably a fluid whose effective viscosity can be changed and controlled, such as magnetorheological and electrorheological fluids. Magnetorheological fluids contains ferromagnetic particles suspended within a base fluid. Magnetorheological fluids are essentially suspensions of micron-sized, magnetizable particles in a carrier fluid. Under normal conditions, magnetorheological fluid is a free-flowing liquid. However, exposure to a magnetic field can transform the fluid into a near-solid in milliseconds. The fluid can be returned to its liquid state with the removal of the field. When the fluid is exposed to a magnetic field, the effective viscosity of the fluid is changed. Thus, the effective viscosity of the fluid can be actively changed by controlling the presence and strength of a magnetic field. Electrorheological fluids are similar but are effected by the presence of an electrical field or current. Because of the similarities of the magnetorheological and electrorheological fluids, only the control of the magnetorheological fluid will be described with respect to the fluid 50, but it should be understood electrorheological fluid and the appropriate control devices could be substituted.

The apparatus 30 further includes a reservoir 52. The reservoir 52 can be any suitable structure for the selective storage of fluid 50. A passageway 54 is provided between reservoir 52 and the bladder 42 to provide fluid communication therebetween. A passageway 56 is provided between the reservoir 52 and the bladder 44 to provide fluid communication therebetween.

The apparatus 30 further includes a control device 60 preferably mounted in each of the passageways 54 and 56. To provide a controlled magnetic field for the fluid 50, the control device 60 includes one or more magnetic chokes or electromagnets. The electromagnets are electrically connected to a control unit 62, such as a microprocessor. The magnetic choke can be positioned at any suitable location where fluid flows between the reservoir 52 and the chambers 48.

The control unit 62 is preferably connected to one or more sensors 64 to modify the control of the devices 60 based on information obtained from the sensors. Examples of suitable sensors include an occupant weight sensor, a vehicle speed and/or deceleration/acceleration sensor, a seat position sensor, and an occupant position sensor. One or more of the sensors may be used to impact the control of the energy absorbing device. The seat position sensor detects the fore/aft position of the seat and/or the recline angle of the seat back, thereby providing general information regarding the location of the driver relative to the apparatus. A displacement sensor or the load sensor can be connected to the apparatus 30 itself or a component associated with the apparatus 30 to determine the movement and load of the apparatus 30 to provide feedback information during the impact condition. It is contemplated that the output from some of the desired sensors may be available by using sensors already in place in the vehicle which are used for other vehicle systems. For example, the desired seat position sensor may already be used in a power seat mechanism. In another example, an occupant weight sensor may be used in a vehicle air bag or curtain restraint system to determine if the air bag is to be deployed or not depending on the presence of an occupant. Vehicle speed and acceleration sensors may be used in the vehicle's stability braking system.

Figure 3:
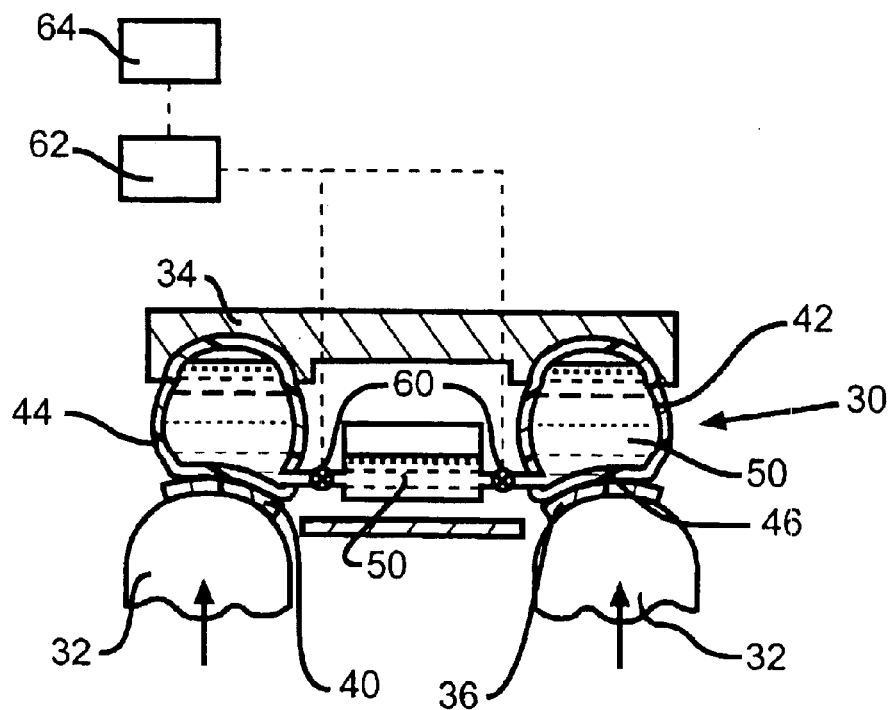
FIG. 3 is a schematic cross-sectional view of the knee bolster region of FIG. 1, wherein the occupant's knees are propelled into the apparatus.

During an impact situation, such as a frontal impact, the knees 32 of the driver may be forced in a forward direction, thereby impacting the trim panels 36 and 40, as shown in FIG. 3. The panels 36 and 40 are preferably mounted so that they will deflect or move against the front walls 46 of the bladders 42 and 44. Impact from the front walls 46 will cause the bladders 42 and 44 to dimensionally change, as shown in FIG. 3, and force fluid from out of the chambers 48 into the reservoir 52 via the passageways 54 and 56. The front walls 46 of the bladders 42 and 44 are preferably flexible to generally conform to the shape of the panels 36 and 40 and/or the knees 32 of the driver, thereby helping to further reduce injury. During the impact situation, the control unit 62 preferably actuates the control devices 60 to produce a magnetic field to alter the effective viscosity of the fluid in the passageways 54 and 56, thereby effecting the flow of fluid through the passageways 54 and 56. The controlling of the flow of fluid 50 through the passageways 54 and 56 will cause a change in the damping characteristics of the bladders 42 and 44, and therefore the acceleration rate of the front walls 46 of the bladders 42 and 44. The acceleration rate of the front walls 46 generally corresponds to the acceleration rate of the knees 32 of the driver. The acceleration rate is preferably controlled so as to dampen or lesson the impact force exerted on the knees 32 to reduce injury.

Although, the control device 60 could be actuated to transmit a stable and preselected magnetic field, preferably the control device 60 is actively controlled either prior to the impact situation and/or through the duration of the impact. The control devices 60 are actively controlled prior to or during the event so that the energy dissipating rates of the apparatus 30 can be altered depending on various factors, such as for example, the severity of the impact forces, weight of the vehicle, vehicle speed, and the weight and position of the vehicle occupant. More preferably, the control devices 60 control and manage occupant motion through time, and preferably dissipate energy over time reducing the peak forces experienced by the occupant reducing injury. It is generally desirable to translate the front walls 46 a predetermined length regardless of the severity of the impact forces. However, for relatively large impact forces, the apparatus 30 should accept a large load within their translation. Contrary, for relatively small impact forces, the apparatus 30 should accept a small load within their translation.

It should be understood that although the above occupant protection apparatus 30 was described above with respect to being used in a knee bolster region, the occupant protection apparatus 30, as well as other embodiments of occupant protection apparatus described and shown herein, can be used at any suitable location, as described above with respect to FIG. 1. Thus, the occupant protection apparatuses of the present invention can be used to alter the acceleration rate of any body portion of a vehicle occupant, such as the head, neck, arms, hips, and torso.

There is illustrated in FIGS. 4 through 8 other embodiments of occupant protection apparatuses which may include some of the components of the apparatus 30 illustrated in FIGS. 2 and 3, such as the housing 34, the control unit 62, the sensors 64, and the trim panels 36, 38, and 40. Therefore, such corresponding components may not be shown and may be described with similar reference numbers when described with respect to operation of the occupant protection apparatuses.

There is illustrated in FIG. 4, an alternate embodiment of an occupant protection apparatus, indicated generally at 70. The apparatus 70 includes a preferably flexible bladder 72 which defines a chamber 74 containing the fluid 50. The bladder 72 can be mounted relative to a housing (not shown) of the vehicle by any suitable manner. Instead of controlling the flow of fluid from out of the chambers of the bladders, the volume of the fluid 50 within the apparatus 70 is essentially trapped, and therefore remains the same. The apparatus 70 includes a control device 76 connected to an electric winding or circuit, schematically shown at 78. The circuit 78 is positioned adjacent the bladder 72. The control device 76 selectively applies a voltage across the circuit to create a magnetic field, thereby effecting the viscosity/density of the fluid 50 within the chamber 74. The circuit 78 could be positioned such that the entire fluid 50 within the chamber 74 is effected, or only a portion of the fluid.

During an impact condition, a limb or other body part of the occupant will be forced in a direction against the bladder 72, thereby causing the bladder 72 to dimensionally change. Altering the viscosity of the fluid alters the dampening characteristics of the apparatus 70, thereby effecting the acceleration rate of a wall of the bladder 72, and therefore the occupant. The control device 76 can be controlled in any suitable manner, such as that described above with respect to the control device 62 in FIGS. 2 and 3.

The circuit 78 can be any suitable configuration which can produce a magnetic field (or electrical field) about the fluid 50. The circuit 78 can be disposed adjacent the bladder 72 by any suitable manner. For example, the circuit could be attached to an outer or inner wall of the bladder 72. The circuit 78 could be wiring attached to the surface of the walls of the bladder 72 or could be printed thereon. Alternatively, a separate sheet containing the circuit 78 could be disposed or attached to the bladder 72.

In another embodiment of the apparatus 70, the occupant protection apparatus 70 could include an open cell foam disposed in the chamber 74. The open cell foam contains a certain amount of gas or air within a portion of its cells and contains fluid 50 in another portion of its cells. Preferably, the fluid 50 is evenly interspersed within the foam. One of the advantages of using foam, is that less fluid may be used within a desired volume of the chamber. This is advantageous due to the expense of the fluid 50. The foam could also be generally lacking any gas or air within the cell structure, but the foam material itself would be replacing fluid which would normally be present in the chamber 74. Thus, the foam helps reduce the amount of fluid 50 within the chamber 74 while interspersing the fluid 50 to provide a sufficient volume of fluid for effecting the acceleration rate of a wall of the bladder 72.

There is illustrated in FIG. 5 another embodiment of an occupant protection apparatus, indicated generally at 90. The apparatus 90 includes a bladder defined by a housing 92 and a wall 94 movably mounted relative to the housing 92. The housing 92 and the wall 94 define a chamber 96. Preferably, the chamber includes fluid 50 interspersed within an open cell foam, as describe above, wherein an amount of gas or air is trapped within cells of the foam material. The wall 94 and/or the housing 92 can be flexible or relatively rigid.

During an impact condition, a limb or other body part of the occupant will be forced in a direction against the wall 94, thereby causing the wall 94 to move inward towards the housing 92, as shown in FIG. 6. The movement of the wall 94 reduces the volume of the chamber 96. The decrease in the volume of the chamber is provided by the compression of the gas within the foam material. A control device, similar to the control device 76 and circuit 78, alters the viscosity of the fluid which alters the dampening characteristics of the apparatus 90. This is turn, effects the acceleration rate of the wall 94 of the bladder 72, and therefore the occupant. The control device 76 can be controlled in any suitable manner, such as that described above with respect to the control device 62 in FIGS. 2 and 3.

There is illustrated in FIG. 7, yet another alternate embodiment of an occupant protection apparatus, indicated generally at 100. The apparatus 100 includes a plurality of bladders 102 mounted within a housing 104. The bladders 102 define chambers in which fluid 50 is contained. The bladders 102 may or may not contain a foam material therein. A preferably flexible trim panel 106 is extended across an opening of the housing 104 to further mount the bladders 102 within the housing 104. Preferably, each of the bladders 102 includes a control device including a sheet 108 having a circuit mounted thereon, similar to the circuit 78 described above. Thus, each of the bladders 102 can be independently controlled. Of course, if the sheets 108 are sandwiched between the bladders 102 as shown in FIG. 7, the magnetic field emitted from one sheet 108 may effect one or more bladders 102. The fluid 50 within each of the bladders 102 can be controlled as described above with respect to the apparatus 70.

An advantage of the apparatus 100 is that a relatively high volume of fluid may be attainable within a desired packaging space, due to the stacking of the multiple bladders, yet control of the fluid 50 may be easier controlled than compared to a single bladder having a relatively large volume of fluid and effected by a single control device. For example, the same volume of fluid may be more consistently controlled with multiple magnetic fields effecting a relatively small volume of fluid within each of the multiple bladders, compared to controlling the fluid within a single large bladder with a relatively strong magnetic field.

Another advantage of the apparatus 100 is that the fluid 50 within the bladders 102 may be independently controlled, such as in a sequential manner. For example, the closest bladders 102 facing the trim panel 106 may be controlled to a lesser extent than the furthermost bladders 102, such that the viscosity of the fluid within the bladders 102 closest to the trim panel 106 is less or more free flowing than the fluid 50 within the furthermost bladders 102. Thus, for relatively small impact forces, the closest bladders 102 would deflect more than the furthermost bladders.

The use of a plurality of bladders may also assist in changing the trajectory of the limb or other body part of the occupant. For example, a plurality of bladders could be used in a knee bolster area in a staggered or angled relationship with respect to the direction of the propelled knee, to move the knee in a desired direction upon impact, It should be understood that the features of the occupant protection apparatuses can be used with other described occupant apparatuses. For example, any of the apparatus can include an open cell foam material within their chambers. Alternatively, any of the bladders can be configured to operate with a fixed volume of fluid or can be connected to a reservoir for selectively decreasing the volume of fluid with the chamber. Therefore, the control devices can be in the form of a magnetic chock for passageways or a relatively thin planar circuit.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus comprising:
   a housing;
   a bladder mounted relative to said housing, said bladder having at least a portion defining a non-rigid deformable flexible wall, said bladder defining a chamber having an electrorheological or magnetorheological fluid disposed therein; and
   a device for creating an electrical or magnetic field about a volume of said fluid to alter the effective viscosity of said fluid when said flexible wall is moved relative to said housing, thereby altering the acceleration rate of said flexible wall relative to said housing;
   wherein said device alters the strength of the electrical or magnetic field based on information from a sensor selected from the group of:
      a sensor detecting the speed of the vehicle;
      a sensor detecting the weight of an occupant seated in the vehicle;
      a sensor and microprocessor detecting and calculating the acceleration/deceleration of the vehicle.

2. The apparatus of claim 1, wherein said bladder is a generally thin walled flexible container.

3. The apparatus of claim 1, wherein the volume of said fluid within said chamber is a trapped volume of fluid such that said volume of said fluid does not escape said chamber.

4. The apparatus of claim 1, wherein said device can selectively alter the strength of the electrical or magnetic field.

5. The apparatus of claim 1, wherein movement of said flexible wall decreases the volume of said fluid in said chamber.

6. A The apparatus of claim 1, wherein said apparatus includes a second bladder mounted relative to said housing, wherein said second bladder has at least one flexible wall, and defines a chamber having an electrorheological or magnetorheological fluid disposed therein.

7. The apparatus of claim 6, wherein said bladder defines a first bladder, and said second bladder is positioned adjacent said first bladder such that a deflection of one of said flexible walls of said first and second bladders causes a deflection of the other one of said flexible walls of said first and second bladders.

8. The apparatus of claim 6, wherein said device is adapted to create an electrical or magnetic field about a volume of said fluid within said second bladder to alter the effective viscosity of said fluid in said second bladder when said flexible wall of said second bladder is moved relative to said housing, thereby affecting the acceleration rate of said flexible wall of said second bladder relative to said housing.

9. The apparatus of claim 6, further including a second device adapted to create an electrical or magnetic field about a volume of said fluid within said second bladder to alter the effective viscosity of said fluid in said second bladder when said flexible wall of said second bladder is moved relative to said housing, thereby affecting the acceleration rate of said flexible wall of said second bladder relative to said housing.

10. The apparatus of claim 1, further including an open cell foam disposed in said chamber such that said open cell foam contains gas within a portion of the cells and contains said fluid within another portion of said cells, such that said gas is generally interspersed within said fluid.

11. A The apparatus of claim 1, wherein said device includes an electrical circuit positioned adjacent said fluid, such that said device sends a current through said circuit for creating a magnetic field about said fluid thereby altering the effective viscosity of said fluid.

12. The apparatus of claim 1, further including a reservoir for the storage of said fluid and a single passageway providing fluid communication between said chamber and said reservoir, wherein said device is located adjacent said passageway such that the flow of fluid through said passageway from said chamber to said reservoir is altered by the electrical or magnetic field.

13. The apparatus of claim 12, wherein said passageway includes a valve disposed therein for controlling the flow of fluid.

14. The apparatus of claim 12, further including a second bladder in fluid communication with said reservoir.

15. An apparatus comprising:
   a housing defining a chamber having an electrorheological or magnetorheological fluid disposed therein;

a wall movably mounted relative to said housing such that movement of said wall alters the volume of said chamber;

an open cell foam disposed in said chamber such that said open cell foam contains gas within a portion of the cells and contains said fluid within another portion of said cells, such that said gas is generally interspersed within said fluid; and a device for creating an electrical or magnetic field about a volume of said fluid to alter the effective viscosity of said fluid when said wall is moved to decrease the volume of said chamber by the compression of the gas, thereby altering the acceleration rate of the wall relative to said housing.

16. The apparatus of claim 15, wherein said wall is flexible.

17. The apparatus of claim 15, wherein the volume of said fluid within said chamber is a trapped volume of fluid such that said volume of said fluid does not escape said chamber.

18. The apparatus of claim 15, wherein said device can selectively alter the strength of the electrical or magnetic field.

19. The apparatus of claim 15, wherein said device alters the strength of the electrical or magnetic field based on information from a sensor selected from the group of:

a sensor detecting the speed of the vehicle;

a sensor detecting the weight of an occupant seated in the vehicle;

a sensor and microprocessor detecting and calculating the acceleration/deceleration of the vehicle.

20. An apparatus comprising:

a housing;

a bladder mounted relative to said housing, said bladder having at least one flexible wall, said bladder defining a chamber having an electrorheological or magnetorheological fluid disposed therein;

a second bladder mounted relative to said housing, wherein said second bladder has at least one flexible wall, and defines a chamber having an electrorheological or magnetorheological fluid disposed therein; and a device for creating an electrical or magnetic field about a volume of said fluid to alter the effective viscosity of said fluid when said flexible wall is moved relative to said housing, thereby altering the acceleration rate of said flexible wall relative to said housing, wherein said second bladder is positioned adjacent said first bladder such that a deflection of one of said flexible walls of said first and second bladders causes a deflection of the other one of said flexible walls of said first and second bladders.

* * * * *